(12) United States Patent
Van Der Kooij et al.

(10) Patent No.: US 8,394,743 B2
(45) Date of Patent: Mar. 12, 2013

(54) PROCESS FLUID

(75) Inventors: Felix Van Der Kooij, Schiedam (NL); Henk Lekkerkerker, Maarn (NL); Edo Sicco Boek, Cambridgeshire (GB)

(73) Assignee: M-I L.L.C., Houston, TX (US)

( * ) Notice: Subject to any disclaimer, the term of this patent is extended or adjusted under 35 U.S.C. 154(b) by 790 days.

(21) Appl. No.: 12/023,636

(22) Filed: Jan. 31, 2008

(65) Prior Publication Data

US 2008/0200350 A1 Aug. 21, 2008

Related U.S. Application Data

(63) Continuation of application No. 10/486,043, filed as application No. PCT/GB02/03623 on Aug. 6, 2002, now Pat. No. 7,338,922.

(30) Foreign Application Priority Data

Aug. 8, 2001 (GB) .................................. 0119375.4

(51) Int. Cl.
 *C09K 8/00* (2006.01)
(52) U.S. Cl. ........................................ 507/140; 507/269
(58) Field of Classification Search .................. 507/140, 507/269
 See application file for complete search history.

(56) References Cited

U.S. PATENT DOCUMENTS

| | | | |
|---|---|---|---|
| 3,396,105 A | 8/1968 | Burdyn et al. | |
| 4,301,016 A | 11/1981 | Carriere et al. | |
| 4,384,096 A | 5/1983 | Sonnabend | |
| 4,385,155 A | 5/1983 | Michaels | |
| 4,425,461 A | 1/1984 | Turner et al. | |
| 4,447,341 A * | 5/1984 | Block | 507/124 |
| 4,486,316 A | 12/1984 | Carriere et al. | |
| 4,525,522 A | 6/1985 | Turner et al. | |
| 4,537,688 A | 8/1985 | Peiffer et al. | |
| 4,579,669 A | 4/1986 | Walker et al. | |
| 4,600,515 A | 7/1986 | Gleason et al. | |
| 4,657,943 A | 4/1987 | Wietsma | |
| 4,670,501 A | 6/1987 | Dymond et al. | |
| 4,675,119 A * | 6/1987 | Farrar et al. | 507/121 |
| 4,740,319 A | 4/1988 | Patel et al. | |
| 4,777,200 A | 10/1988 | Dymond et al. | |
| 4,828,724 A | 5/1989 | Davidson | |
| RE33,008 E | 8/1989 | Ruffner et al. | |
| 4,978,461 A | 12/1990 | Peiffer et al. | |
| 5,232,627 A * | 8/1993 | Burba et al. | 516/110 |
| 5,518,996 A | 5/1996 | Maroy et al. | |
| 5,532,212 A * | 7/1996 | Patel | 507/140 |
| 5,588,488 A | 12/1996 | Vijn et al. | |
| 5,741,761 A | 4/1998 | Varadaraj | |
| 5,770,760 A | 6/1998 | Robinson | |
| 5,913,364 A | 6/1999 | Sweatman | |
| 5,964,692 A | 10/1999 | Blezard et al. | |
| 6,258,757 B1 | 7/2001 | Sweatman et al. | |
| 6,715,568 B1 | 4/2004 | Bailey | |
| 2003/0022987 A1 | 1/2003 | Matz et al. | |
| 2005/0049150 A1 | 3/2005 | Patel et al. | |

FOREIGN PATENT DOCUMENTS

| | | |
|---|---|---|
| DE | 201478 | 8/1981 |
| EP | 0070075 | 1/1987 |
| EP | 0875657 | 11/1998 |
| EP | 0875658 | 11/1998 |
| EP | 1024154 | 8/2000 |
| GB | 2131067 | 6/1984 |
| GB | 2297774 | 8/1996 |
| WO | 9624646 | 8/1996 |
| WO | 0105365 | 1/2001 |

OTHER PUBLICATIONS

Old.IUPAC.org http://old.iupac.org/reports/2001/colloid_2001/manual_of_s_and_t/node33.html.*
C.M. Blow et al., "Raw Polymeric Materials", Rubber Technology and Manufacture (1982) p. 96.
L.J. Fraser et al., "Mechanistic Investigation of the Formation Damaging Characteristics of Mixed Metal Hydroxide Drill-In Fluids and Comparison With Polymer-Base Fluids", SPE 30501 SPE Annual Tech. Conf. and Exhibition, Dallas, TX, Oct. 22-25, 1995.
L. Bailey et al., "New Insight into the Mechanisms of Shale Inhibition Using Water Based Silicate Drilling Fluids", IADC/SPE 39401 Drilling Conference, Dallas, TX, Mar. 3-6, 1998.

* cited by examiner

*Primary Examiner* — Kuo-Liang Peng
(74) *Attorney, Agent, or Firm* — Dann, Dorfman, Herrell and Skillman, P.C.

(57) ABSTRACT

A water-based, shear-thinning process fluid comprises bentonite, aluminum hydroxide particles, and salt. The median diameter (by weight) of the aluminum hydroxide particles does not exceed 2 μm.

7 Claims, 13 Drawing Sheets

PROCESS FLUID

CROSS-REFERENCE TO RELATED APPLICATION

This application is a Continuation of prior application Ser. No. 10/486,043, filed Jul. 2, 2004, now U.S. Pat. No. 7,338,922, which is the U.S. National Phase of International Application No. PCT/GB02/03623, filed Aug. 6, 2002, the entireties of which are incorporated herein by reference.

FIELD OF THE INVENTION

Background to the Invention

Thickened, water-based, process fluids which exhibit shear-thinning behaviour are useful in a number of technical fields.

In particular for hydrocarbon well applications such fluids are used as e.g. drilling fluids, water control fluids and fracturing fluids. A typical theological requirement for the fluids is a reversible and severe drop in viscosity when the shear rate imposed on the fluid is increased.

Aqueous drilling fluids commonly contain clay particles and thickening agents. For example U.S. Pat. No. 4,990,268 discloses a drilling fluid which contains negatively charged bentonite particles and positively charged mixed metal hydroxide particles and which is thickened by a heteroflocculation mechanism involving the formation of a gel network based on Coulombic (electrostatic) attraction between the bentonite and mixed metal hydroxide particles. A commercially available calcined mixed metal hydroxide powder thickening agent supplied by M-I L.L.C. is sold under the name Visplex™.

Clay-free drilling fluids containing viscosifying aluminium hydroxide compounds are also known, as disclosed e.g. in U.S. Pat. No. 4,240,915, U.S. Pat. No. 4,389,319, U.S. Pat. No. 4,349,443 and U.S. Pat. No. 4,486,318.

However, the stability of the theological behaviour of these fluids may be threatened by e.g. degradation at elevated temperatures, oxidation and/or the presence of contaminating salts, and an object of the present invention is to provide a water-based process fluid which exhibits acceptable rheological behaviour over a wide range of operating conditions.

SUMMARY OF THE INVENTION

In general terms, a first aspect of the present invention provides a shear-thinning, water-based process fluid comprising clay particles, colloidal particles, and salt.

In such a fluid at 20° C. (and preferably also at higher temperatures), primarily van der Waals interactions between the clay and colloidal particles can organise the clay and colloidal particles into a gel network which thickens the fluid. These interactions can be broken and reimposed as the shear rate experienced by the fluid respectively increases and decreases, leading to reversible shear-thinning behaviour.

The process fluid may be e.g. a drilling fluid, water control fluid, fracturing fluid, or other treatment fluid for use in a hydrocarbon well.

A primary purpose of the salt is to form ions in solution which electrostatically screen the clay and the colloidal particles. This prevents or reduces electrostatic interactions between the particles so that van der Waals interactions can be established. Thus by "salt" we mean any soluble compound or compounds which is/are able to provide such ions. Preferably the salt comprises NaCl and/or KCl. In a process fluid such as a sea water-based drilling mud these salts can be provided by the sea water. However, if salts of higher-valency cations are used, these will be effective at lower concentrations than NaCl or KCl, following the Schulze-Hardy rule for the screening of double layer repulsions.

Thus, whereas known drilling fluids which are primarily thickened by electrostatic attractions between particles (e.g. bentonite base muds containing Visplex) are sensitive to salt contamination (we believe the salt reduces the efficiency of the heteroflocculation mechanism by promoting aggregation of like particles, thus disturbing desirable electrostatic attractions and reducing the amount of thickening), the process fluid of the present invention is generally insensitive to or unaffected by such contamination because most salts do not reduce the van der Waals attractions between the particles. Indeed the process fluid of the present invention includes salt. This can be a significant advantage e.g. in off-shore hydrocarbon well applications where it is often convenient to make up process fluids from sea water.

The fluid may further comprise a fluid loss control agent, such as Floplex™, IdFlo™ (both supplied by M-I L.L.C.) or other modified starch based agent for reducing fluid loss during well drilling operations. Like salt additions, these types of agent tend to decrease the effectiveness of process fluids in which thickening is caused by electrostatic attractions between particles. However, we have found that they do not, in general, degrade the performance of fluids according to the present invention. In particular, because fluids according to the present invention already contain salt, they are relatively insensitive to further additions of charged species. Thus it becomes possible to use fluid loss control agents which form charged species in solution and therefore would have downgraded the theological performance of conventional drilling fluids.

The clay particles may be of bentonite. Preferably, the clay particles (which are generally in the form of platelets) have an average diameter in the range 0.1 to 2 µm and/or an average thickness in the range of 0.01 to 0.001 µm.

The colloidal particles may be formed from any suitable compound(s) which promotes van der Waals interactions between the clay and colloidal particles. Thus the colloidal particles may be of metal oxides and/or hydroxides, which have in general relatively large Hamaker constants characterising the interactions between macroscopic particles in liquids (see e.g. chapter 11 and table 11.2 of J. N. Israelachvili: "Intermolecular and surface forces", $2^{nd}$ edition, Academic Press, London, 1992) and therefore promote van der Waals attractions. For example, the particles may be of aluminium, magnesium and/or zirconium oxide and/or hydroxide. Preferably the particles include aluminium hydroxide compounds.

In one embodiment, the median or mean diameter (by weight) of the colloidal particles does not exceed 2 µm, and preferably does not exceed 1 µm. By limiting the size of the colloidal particles, the particles more readily form a colloidal suspension in the fluid. Also their weight-efficiency for thickening the fluid increases.

Where it pertains to colloidal particles, use herein of the term "diameter" does not imply that the colloidal particles are required to be spherical. The term is to be understood as encompassing the spherical-equivalent diameter of non-spherical colloidal particles as well as the "true" geometrical diameter of spherical colloidal particles, as the case may be.

Clay and colloidal particle sizes may be measured by transmission electron microscopy (TEM). Alternatively or additionally they may be measured indirectly from sedimentation rates determined by ultra-centrifuge experiments (see e.g. J.

L. Cole and J. C. Hansen, *Journal of Biomolecular Techniques*, 10, (1999), 163). This technique is particularly suitable for measuring the spherical-equivalent diameter of non-spherical colloidal particles.

For the interpretation of sedimentation rates, the sedimentation coefficient, s, is given by the slope of $\ln(r(t)-r(t0))$ versus $\Omega^2 t$; where r(t) is the amount of sedimentation (as measured e.g. by absorbance) at a radial distance r from the center of rotation at a time t, and $\Omega$ is the angular velocity of the ultra-centrifuge. However, s, is also defined in the Svedberg equation (T. Svedberg and K. O. Pedersen, *The Ultracentrifuge*, Theodor Steinkopff, Dresden, Germany, 1940) by $s = V \Delta \varrho /f$, where V (which equals $(4/3)\pi R^3$) is the volume of the particle, $\Delta \varrho$ is the mass density difference between the particle and the solvent, and f is the Stokes friction factor equal to $6\pi\eta R$ (R being the radius of particles in the case of spherical particles or the sphere-equivalent radius in the case of non-spherical particles, and eta. being the solvent viscosity). Thus, R (and hence the particle diameter, 2R) can be determined from a measured value for s, and knowledge of $\Delta \varrho$ and $\eta$. Using the ultra-centrifuge technique average particle diameters and particle diameter distributions can be determined.

Thus one preferred embodiment of the present invention provides a water-based, shear-thinning process fluid comprising bentonite, aluminium hydroxide particles, and salt, wherein the median or mean diameter (by weight) of the aluminium hydroxide particles does not exceed 2 μm.

The fluid may have a pH at or above the isoelectric point of the colloidal particles. For example, aluminium hydroxide particles (as exemplified by gibbsite or boehmite) have an isoelectric point of about pH 9.5 (A. Wierenga et al., *Colloids Surfaces A*, Vol. 134, (1998), 359). Thus, if the particles are of aluminium hydroxide, the pH of the fluid is preferably in the range 9.5-11. Generally clay particles carry a negative charge in aqueous suspension at pH 7 and above, and by imposing a pH at or above the isoelectric point the colloidal particles will lack an opposite charge. This has the effect of further promoting van der Waals over electrostatic attractions.

Preferably the colloidal particles are non-spherical. More preferably they have a platelet (e.g. as in gibbsite) and/or rod-like (e.g. as in boehmite) morphology. In terms of promoting gel networks based on van der Waals interactions, these morphologies seem to be compatible with the plate-like shape of most clay (and particularly bentonite) particles. Also, we believe the larger surface area of non-spherical particles promotes van der Waals interactions.

In one embodiment a surfactant is provided on the surfaces of the colloidal particles. Particles with surfactant appear to be more easily dispersed when formulating the fluid. We believe that, by reducing inter-colloidal particle aggregation and enhancing clay-colloid heteroflocculation, they also increase the amount of thickening of particularly bentonite-containing process fluids.

Preferably the concentration of the colloidal particles in the fluid is in the range 0.5 to 6 g/l, and more preferably in the range 1 to 4 g/l. Preferably the concentration of the clay particles in the fluid is in the range 5 to 60 g/l, and more preferably in the range 15 to 40 g/l. Preferably the concentration of the salt in the fluid is in the range 5 to 150 g/l, and more preferably in the range 10 to 80 g/l.

The process fluid may have a 10" gel strength at 20° C. in the range 15 to 70 Pa. By '10" gel strength' we mean the stress measured at a shear rate of 5 $s^{-1}$ after a 10 second shear-free period.

Preferably the process fluid maintains a 10" gel strength at 20° C. in the range 15 to 70 Pa after ageing at a pressure of 1.7 MPa for consecutive periods of 16 hours at 240° F. (115.6° C.) and 16 hours at 300° F. (148.9° C.).

The process fluid may exhibit reversible shear-thinning behaviour at 20° C. for all shear rates in the shear rate range 5 to 1000 $s^{-1}$.

The process fluid may have a rate of change of viscosity with shear rate at 20° C. of between −10 and −0.01 Pa·s for all shear rates in the shear rate range 5 to 1000 $s^{-1}$.

Such performance characteristics suggest that the fluid has theological properties suitable for hydrocarbon well applications.

In a further aspect, the present invention provides for the use of a water-based process fluid of the previous aspect for drilling or treating a hydrocarbon well.

BRIEF DESCRIPTION OF THE DRAWINGS

Specific embodiments of the present invention will now be described with reference to the following drawings in which:

FIG. 10a shows these values for muds containing 28 g/l of bentonite and different amounts of M111; FIG. 10b shows these values for muds containing 33 g/l of bentonite and different amounts of M107; and FIG. 10c shows these values for muds containing 33 g/l of bentonite and different amounts of BN-2.

DETAILED DESCRIPTION

Example systems of bentonite-containing aqueous fluids according to the present invention were produced. These were compared in rheological and fluid loss tests with comparative example systems. Thereafter, a number of gibbsite and boehmite samples were sourced from commercial suppliers, and their suitability for use in the present invention was tested.

Example Systems

Figure 1:
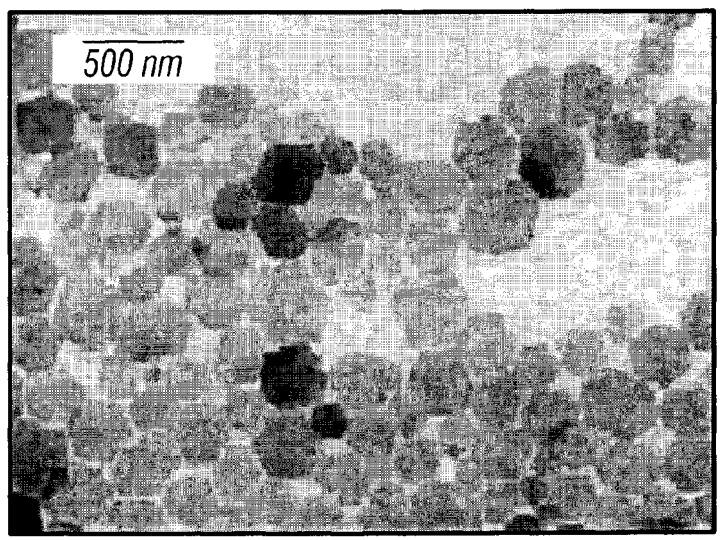
FIG. 1 shows a TEM micrograph of typical gibbsite particles.

Example systems were produced containing bentonite, NaCl and either gibbsite or boehmite colloidal particles. The gibbsite and boehmite particles were formed in aqueous suspension from fine chemicals as described e.g. by A. Wierenga et al., *Colloids Surfaces A*, Vol. 134, (1998), 359, A. P. Philipse et al. *Langmuir*, Vol. 10, (1994), 4451, and F. M. van der Kooij et al., *J. Phys. Chem.* B, Vol. 102, (1998), 7829. The average largest dimension of the (plate-like) gibbsite particles was around 200 nm (FIG. 1 shows a TEM micrograph of typical gibbsite particles). The average largest dimension of the (rod-like) boehmite particles was also around 200 nm. Thus the median diameter of the colloidal particles did not exceed 1 μm.

Example System 1 contained 33 g/l of bentonite, 3.3 g/l of plate-like gibbsite and 15 g/l of NaCl.

Example System 2 contained 33 g/l of bentonite, 5.4 g/l of rod-like boehmite and 15 g/l of NaCl.

Example System 3 contained 33 g/l of bentonite, 3.9 g/l of plate-like gibbsite and 15 g/l of NaCl.

Comparative Example Systems

Comparative System 1 was a simple reference slurry containing 38 g/l of bentonite.

Comparative System 2 contained 28 g/l of bentonite and 3.3 g/l of proprietary (Visplex) calcined mixed metal hydroxide powder.

Comparative System 3 contained 33 g/l of bentonite and 4.2 g/l of an earlier form Visplex which was produced by a chemical synthetic route and contained an amount of glycerol.

Comparative System 4 contained 33 g/l of bentonite and 3.3 g/l of calcined Visplex.

Comparative System 5 contained 33 g/l of bentonite and 3.6 g/l of calcined Visplex.

Calcined Visplex is predominantly formed of mixed metal hydroxide (see e.g. U.S. Pat. No. 4,990,268) and has a mean particle size of at least 4 μm which is expected to be too large for the formation of a colloidal suspension. The predominant interaction between the bentonite and Visplex particles is believed to be electrostatic. Aqueous fluids containing bentonite and Visplex have been used commercially as drilling fluids.

Rheological Tests

These were performed on a Chan 35™ rheometer. The pH of the Example Systems and Comparative Systems was adjusted to 10.5 before rheological measurements were made. The pH was chosen in order to favour van der Waals interactions between the bentonite and colloidal aluminium hydroxide particles of the Example Systems.

Figure 2:
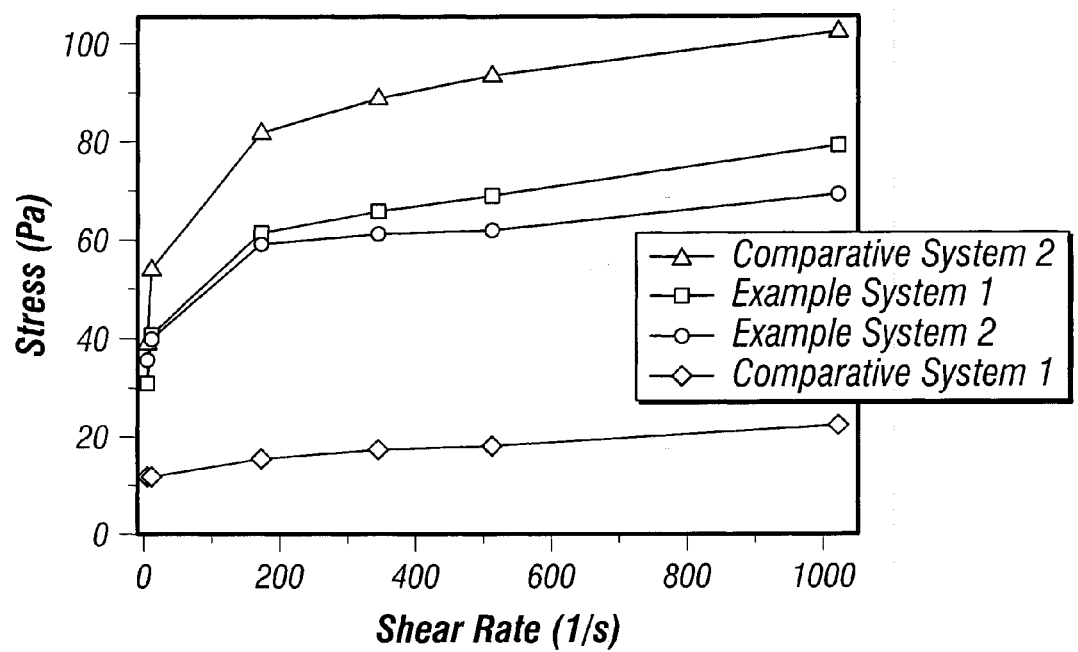
FIG. 2 shows typical flow curves of example and comparative example systems.

FIG. 2 shows typical flow curves measured in a shear sweep at 20° C. for Example Systems 1 and 2 and Comparative Systems 1 and 2. Shear-thinning behaviour was shown by all the fluids, but as expected the fluids containing gibbsite, boehmite and Visplex additions were significantly thicker than the reference fluid containing only bentonite. Example Systems 1 and 2 and Comparative System 2 had viscosities of the order of magnitude needed for drilling fluid applications.

It was noted that the 10" gel strength at 20° C. for Example Systems 1 and 2 was always close to the 5 s$^{-1}$ stress measured in the shear sweep of FIG. 2. This indicates that the gel networks of these fluids are formed almost instantaneously. Thus if used as drilling fluids these fluids should adapt rapidly to local shear rate conditions.

Figure 3:
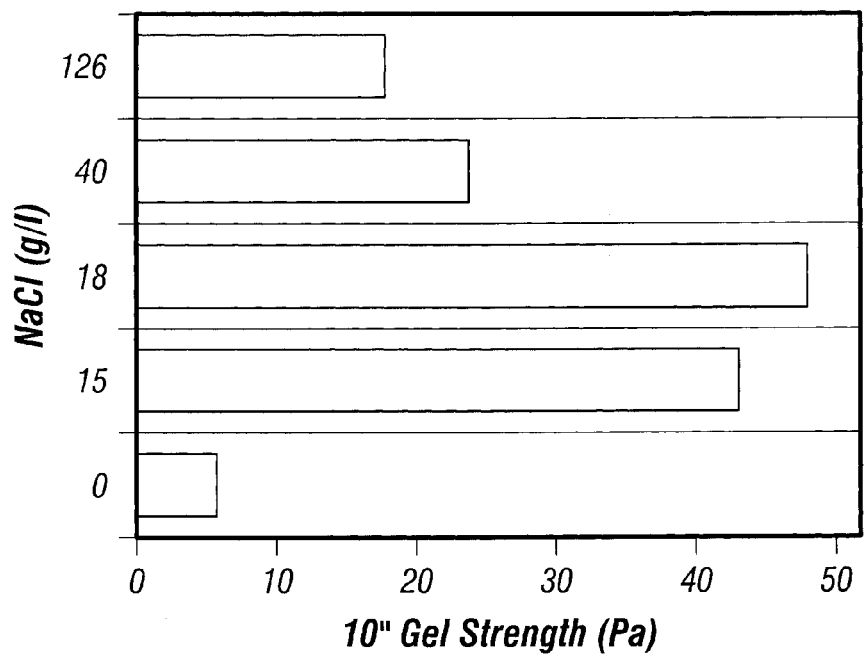
FIG. 3 shows the influence of NaCl concentration on the 10" gel strength of an aqueous fluid containing 33 g/l of bentonite and 3.3 g/l of colloidal gibbsite.

FIG. 3 shows the influence of NaCl concentration on the 10" gel strength at 20° C. of an aqueous fluid containing 33 g/l of bentonite and 3.3 g/l of colloidal gibbsite. The maximum gel strength is reached at about 18 g/l of NaCl (in a similar test using colloidal boehmite instead of gibbsite the maximum was at about 15 g/l of NaCl). Thus these fluids attain their maximum gel strengths at salt concentrations similar to those found in sea water (sea water is essentially 0.5 M NaCl=14 g/l), and could conveniently be formed from sea water in offshore drilling applications.

Figure 4:
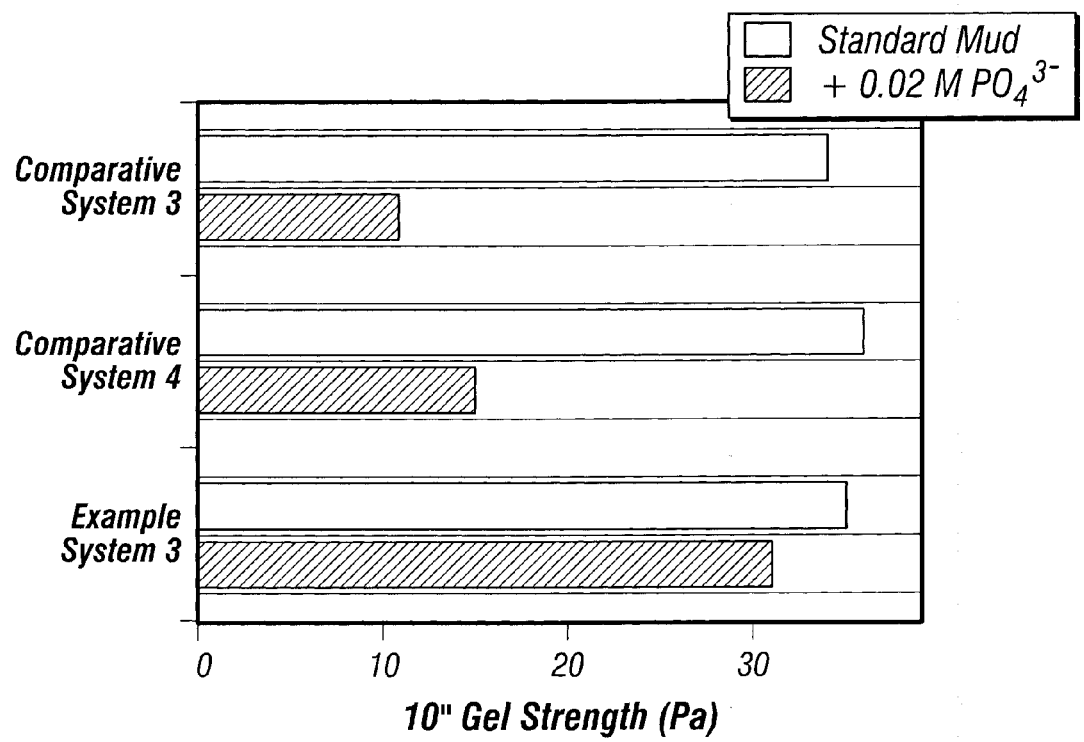
FIG. 4 shows the 10" gel strengths at 20° C. for fluids before and after the addition of a 0.02 M $PO_4^{2-}$ concentration in each fluid.

Evidence of the difference in mechanism underlying gel network formation in the case of the Example Systems and the Comparative Systems is provided by the effect of additions of low concentrations of phosphate anions. FIG. 4 shows the 10" gel strengths at 20° C. for Example System 3 and Comparative Systems 3 and 4 before and after the addition of a 0.02 M PO$_4^{3-}$ concentration in each fluid. The screening of the positive charge on the Visplex particles by the trivalent anions led to a dramatic loss in gel strength of the Comparative Systems, while the strength of the gel network in Example 3 was practically unimpaired. This insensitivity of gel networks produced by van der Waals interactions to anionic contamination should offer substantial advantages in hydrocarbon well applications.

Next the thermal stabilities of various fluids were investigated. Example Systems 1 and 2 and Comparative Systems 1 and 2 were each subjected to 16 hour periods at temperatures of 240, 300, 350 and 375° F. (115.6, 148.9, 176.7 and 190.6° C.) in rolled autoclave bombs prepressurised to 1.7 MPa. Between each ageing period each fluid was homogenised and had its pH readjusted to 10.5 before its 10" gel strength at 20° C. was measured.

Figure 5:
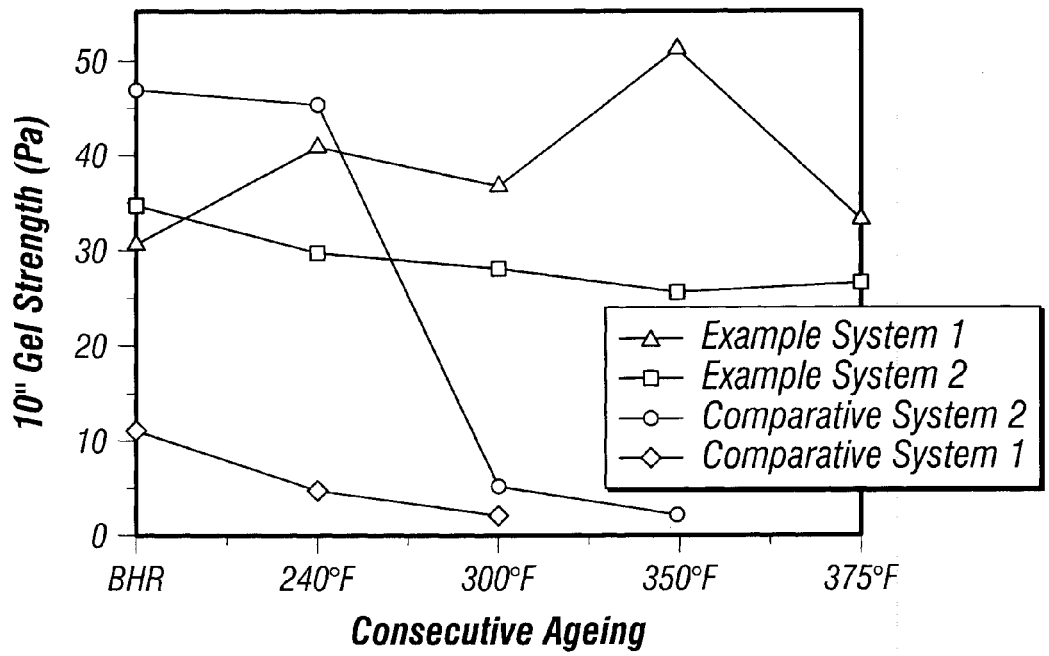
FIG. 5 shows the effect on the 10" gel strength at 20° C. for example and comparative example systems.

FIG. 5 shows the results of the ageing tests. The ability of Comparative System 2 to form a gel network was clearly compromised by ageing above 240° F. In contrast, Example Systems 1 and 2 were thermally stable for temperatures up to at least 375° F.

This thermal stability can be explained by the fact that the gel network generated by van der Waals interactions only requires the presence of small particles (i.e. the gibbsite and boehmite) to bridge the bentonite—a condition which is less likely to be threatened by temperature-induced conversion than the particle surface charge required to form the gel network in the Visplex-based fluids.

Fluid Loss Tests

Figure 6:
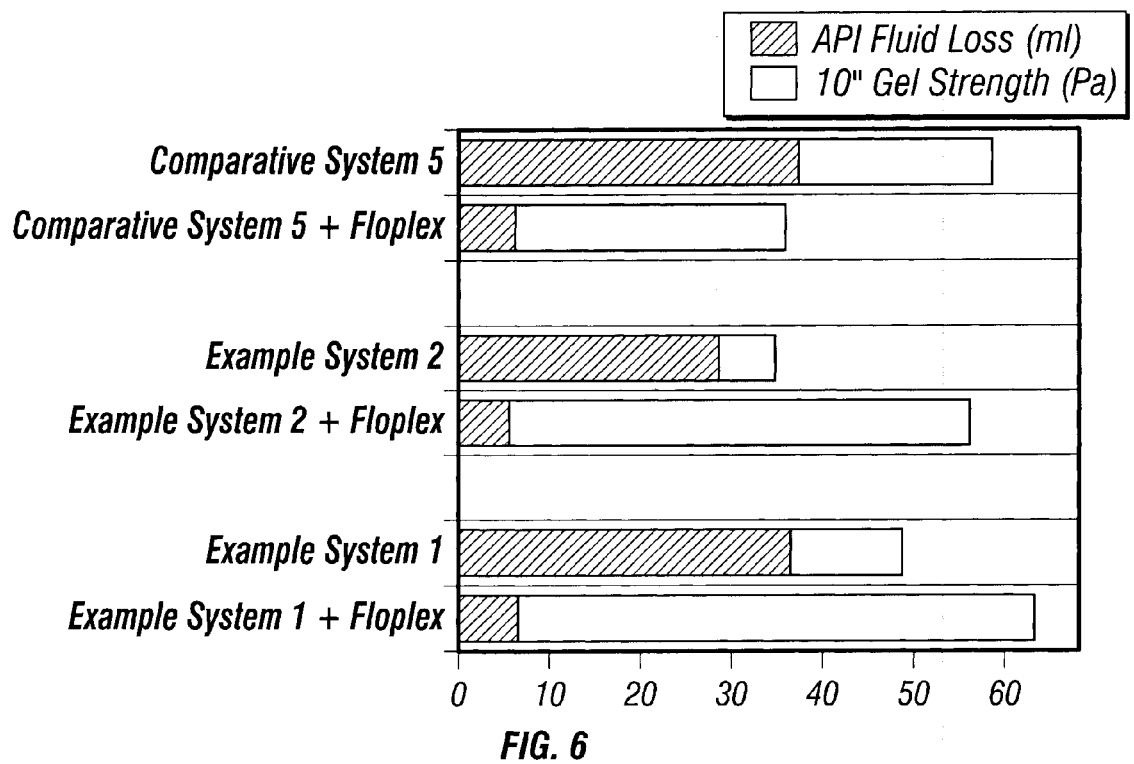
FIG. 6 shows the API fluid loss and 10" gel strengths at 20° C. for fluids before and after the addition of an amount of fluid loss control agent.

API RP 13B fluid loss tests (see API Recommended Practice Standard Procedure for Testing Drilling Fluids, 8$^{th}$ Edition, 1980, American Petroleum Institute, Washington D.C.) were performed on Example Systems 1 and 2 and Comparative System 5. The results of the tests are shown in FIG. 6. The fluid losses of the Example Systems were comparable with those of the Comparative System.

The tests were then repeated after 11 g/l of Floplex fluid loss control agent had been added to each system. Again the fluid losses of the Example Systems were comparable with those of the Comparative System. However, the 10" gel strengths at 20° C. of the Example Systems were increased by the Floplex additions, while the 10" gel strength at 20° of the Comparative System was reduced. This further demonstrates the ability of the process fluids of the present invention to maintain desirable rheological characteristics under a range of conditions.

Commercial Gibbsite and Boehmite Samples

Next, gibbsite and boehmite samples obtained from several commercial suppliers were investigated.

Martinswerk GmbH (PO Box 12 09, D-50102 Bergheim, Germany)

Figure 7A:
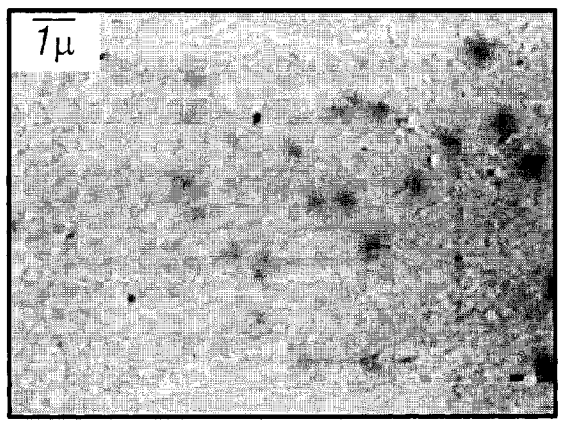
FIGS. 7a-c show respective electron micrographs of M111, M107 and BN-2 powders.
Figure 7B:
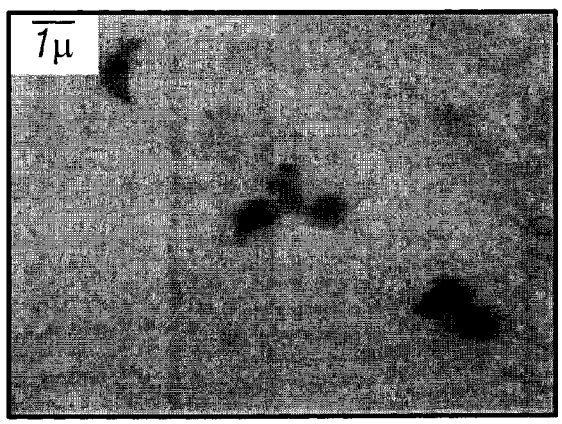
Figure 7C:

Three powder samples were received from this supplier: Martinal OL 107 (M107), Martinal OL 111/LE (M111), both specified by the supplier as fine precipitated aluminium trihydrates ($Al(OH)_3$) with plate-like crystal morphologies, having median particle sizes of approximately 0.7 µm (M111) and 1.5 µm (M107) (as determined by the supplier using light scattering); and Martoxal BN-2 (M BN-2), a boehmite (AlOOH) with a median particle size of approximately 1 µm. The specific surface areas of the three samples are in the range 3 to 20 $m^2/g$. By a combination of TEM and ultracentrifuge measurements we confirmed the presence of particles having diameters slightly below 1 µm in M111 and slightly above 1 µm in M107 and BN-2. The particles of the M111 material contain a small amount of polyacrylate surfactant to facilitate redispersion, which makes the surface anionic at neutral pH. At the pH of 10.5 adopted throughout this study, these particles are anionic as are the gibbsite and boehmite particles of samples at that pH which do not contain surfactant. FIGS. 7a-c show respective electron micrographs of the M111, M107 and BN-2 powders.

Nissan Chemical Industries, Ltd. (7-1, 3-chome, Kanda-Nishili-cho, Chiyoda-ku, Tokyo, Japan 10)

Figure 8A:
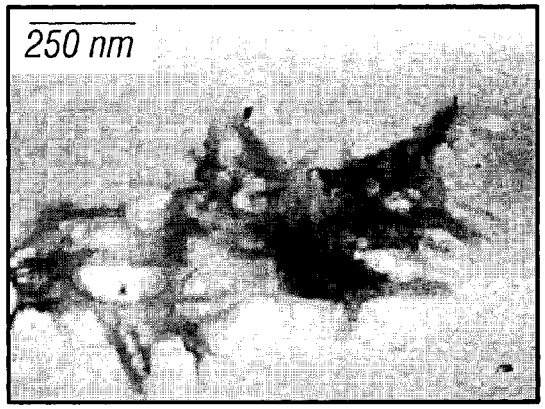
FIGS. 8a-c show respective electron micrographs of AS 100, AS 200 and AS 520 powders.
Figure 8B:
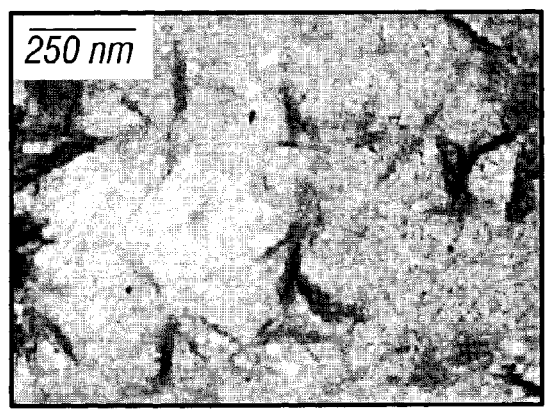
Figure 8C:
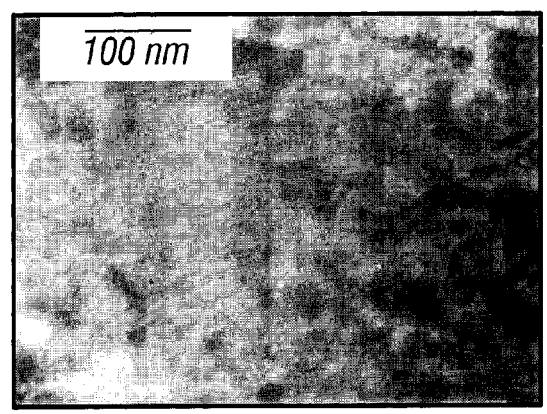

Three samples were received from this supplier: Aluminasol (AS) 100, 200 and 520, all three being in the form of colloidal suspensions. TEM and ultracentrifuge measurements showed that the AS 200 and AS 520 particles were about 50 nm in diameter, whereas the AS 100 particles were about 150 nm in diameter. FIGS. 8a-c show respective electron micrographs of the AS 100, AS 200 and AS 520 powders.

Malakoff Industries Inc. (PO Box 457, Malakoff, Tex. 75148-0487, USA)

Figure 9:
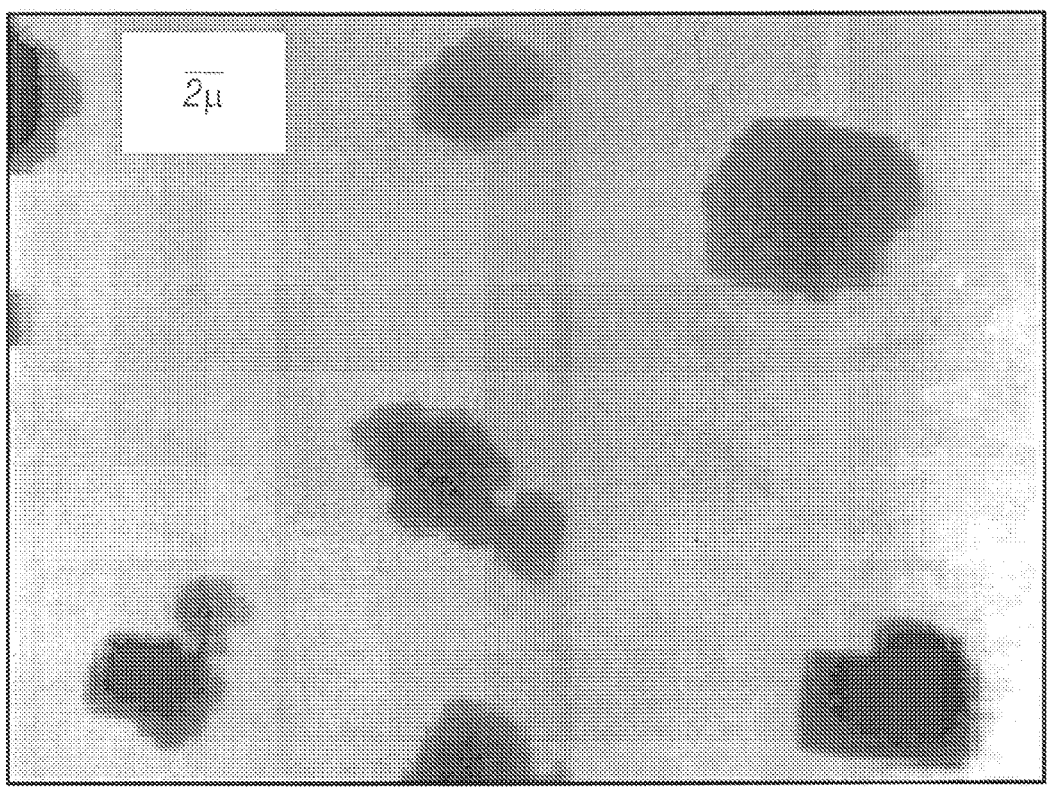
FIG. 9 shows an electron micrograph of MH-1 powder.

One sample of powdered gibbsite was received from this supplier: MH-1. The median particle size was specified as being 3 µm. This was confirmed by TEM observations. FIG. 9 shows an electron micrograph of the MH-1 powder.

For comparison with these commercial samples, a gibbsite suspension (designated GW3A) was prepared in a similar manner to the gibbsite used in the Example Systems discussed above.

Rheology, Thermal Stability and Fluid Loss of Muds Containing M111, M107 and 3N-2

Each of M111, M107 and BN-2 was mixed as a dry powder to a bentonite base and then dispersed in water to form a mud. Further muds were formed by varying the amounts of the M111, M107 and BN-2 powders in the mixtures. Each mud was then rheologically and thermally tested in a similar manner to the Example and Comparative Systems described above (i.e. subjected to consecutive 16 hour periods of hot rolling at temperatures of 240, 300, 350° F. with rheological testing being performed before thermal ageing and between each period).

Figure 10A:
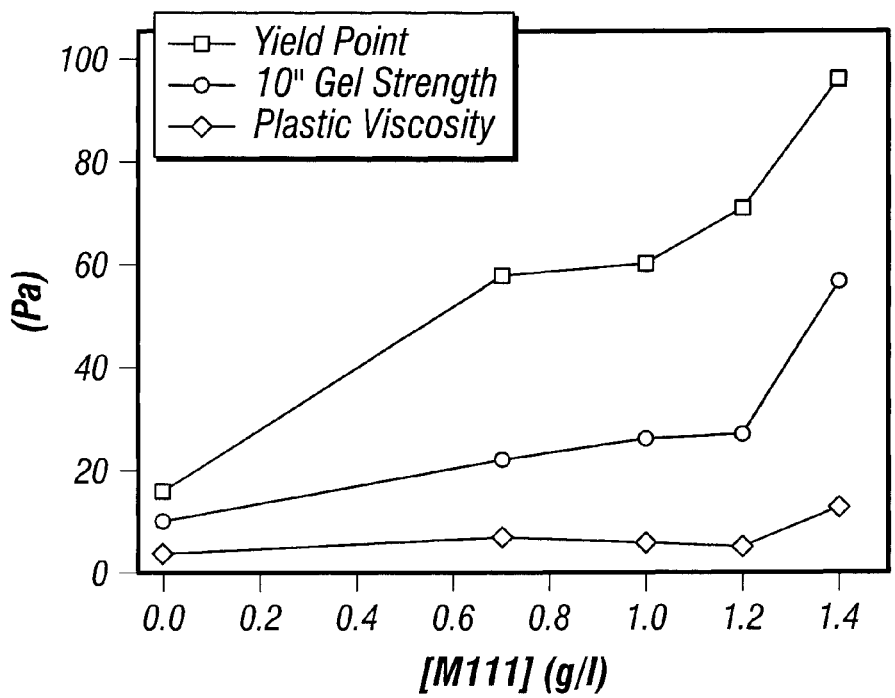
FIGS. 10a-c show values of the yield points, 10" gel strengths at 20° C. and plastic viscosities of various muds.
Figure 10B:
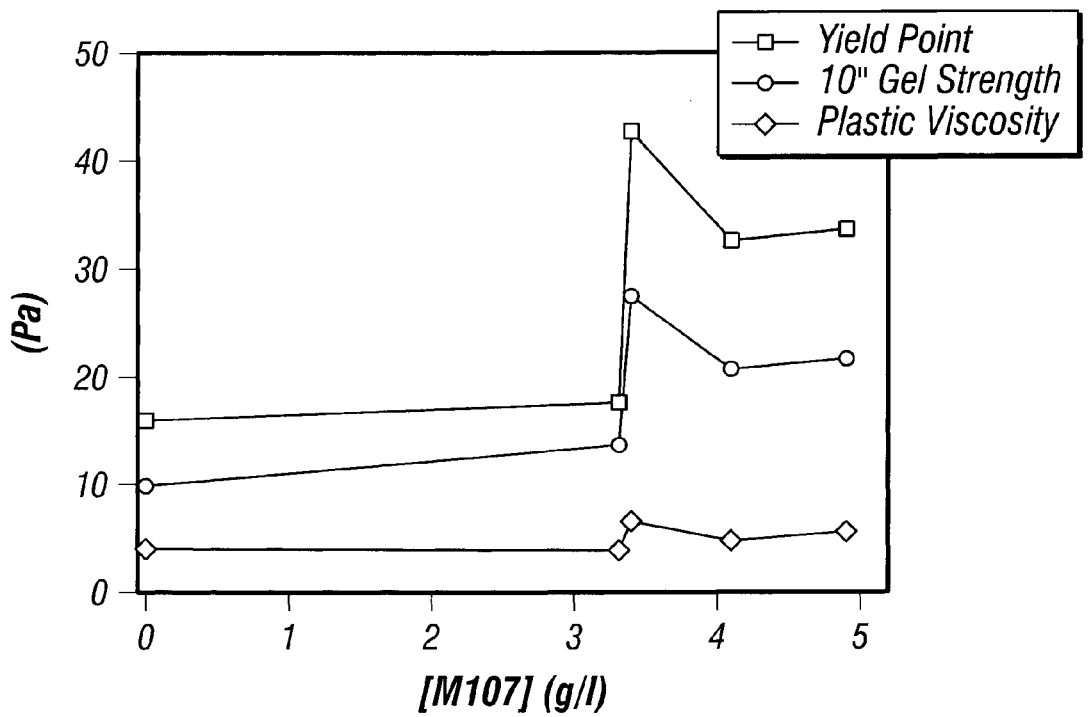
Figure 10C:
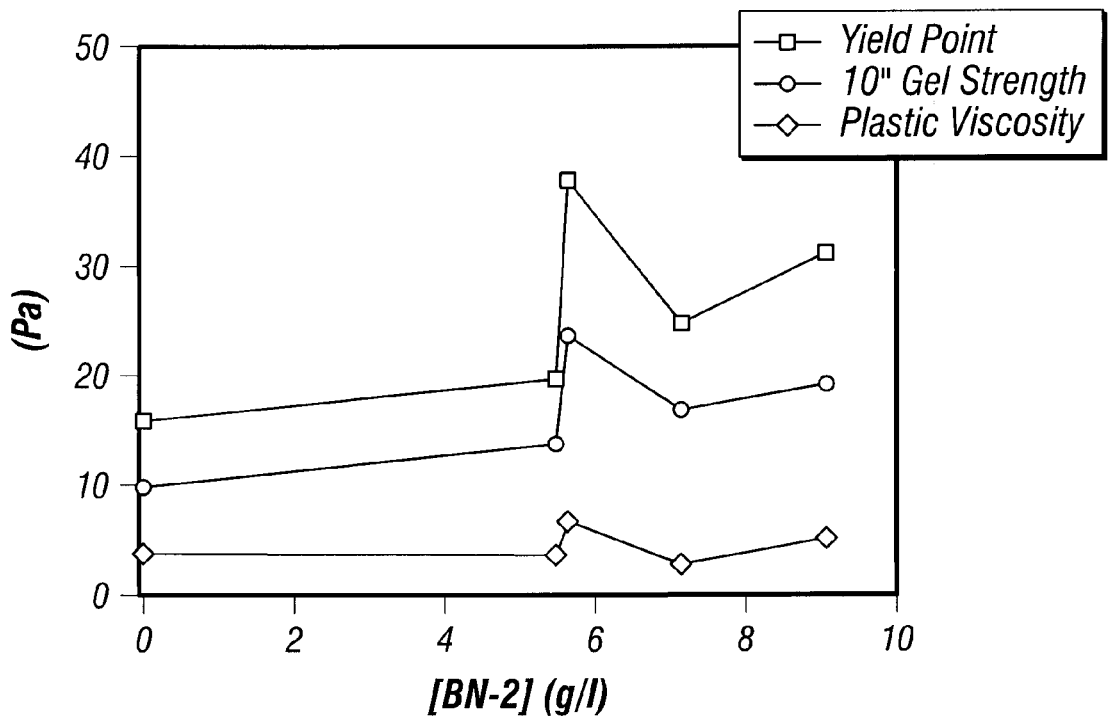
Figure 11A:
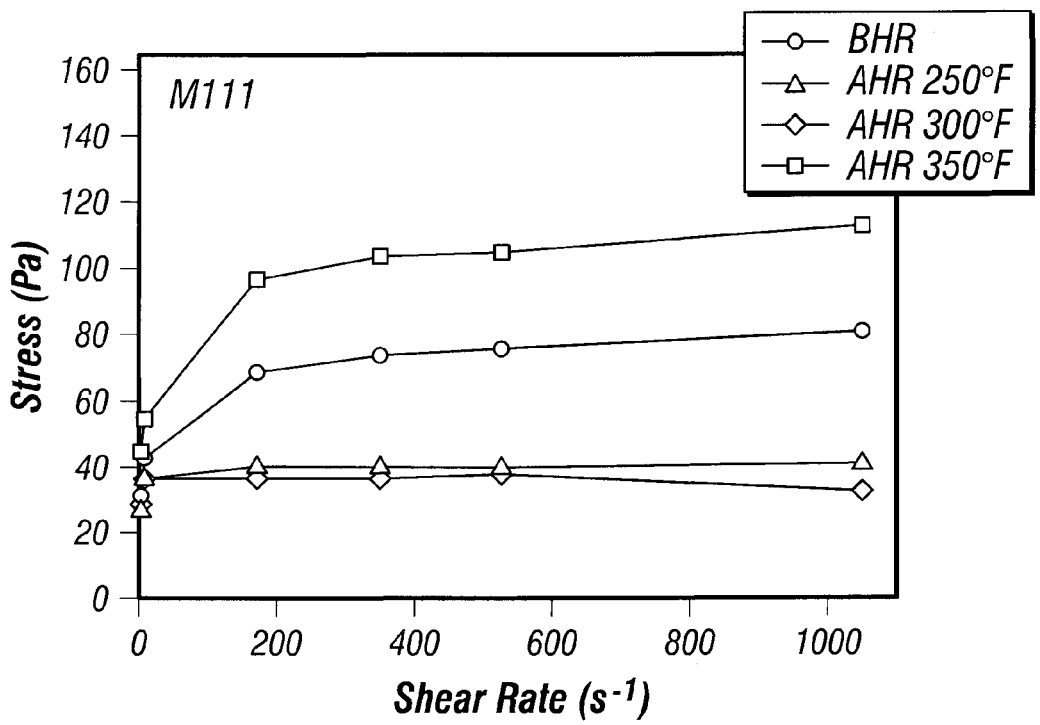
FIGS. 11a-d respectively show flow curves for four mixtures before hot rolling (BHR) and after hot rolling (AHR) at ageing temperatures of 250, 300 and 350° F., the mixtures containing (a) 28 g/l bentonite and 1.2 g/l M111, (b) 33 g/l bentonite and 3.4 g/l M107, (c) 33 g/l bentonite and 5.6 g/l BN-2, and (d) 33 g/l bentonite and 3.3 g/l GW3A.
Figure 11B:
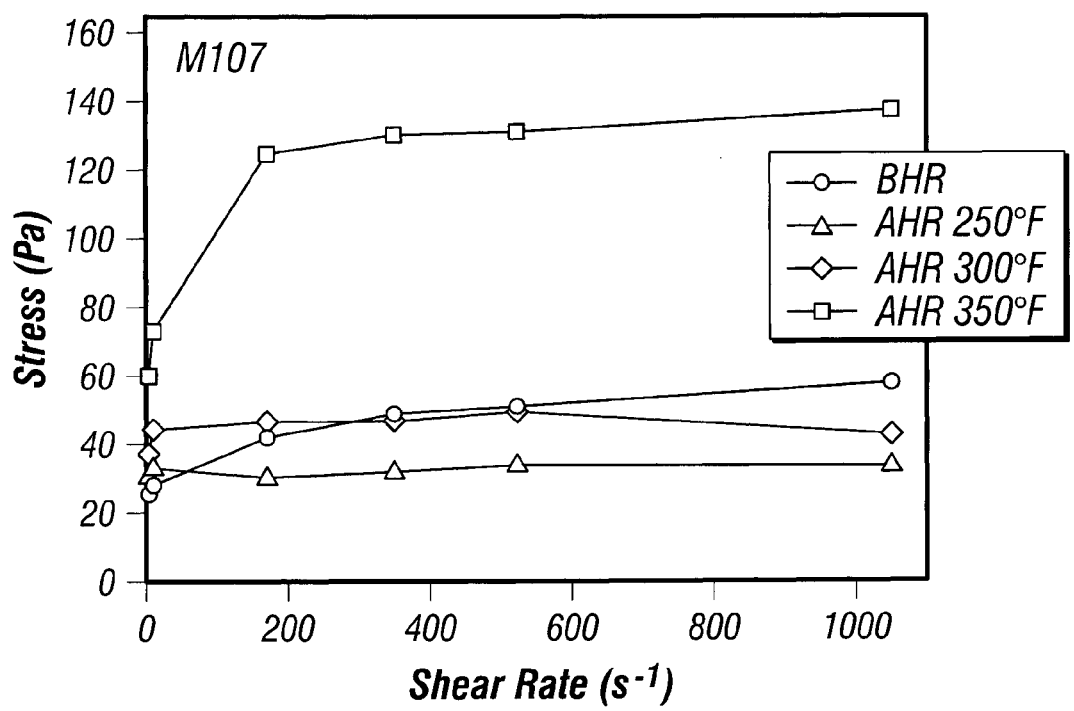
Figure 11C:
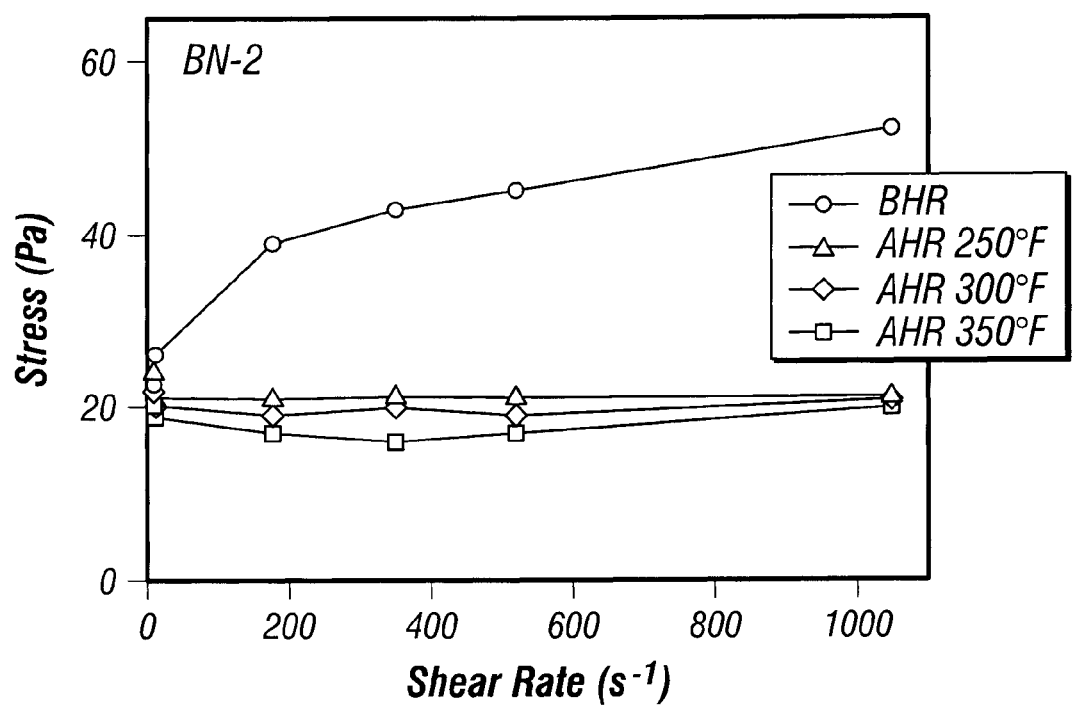
Figure 11D:
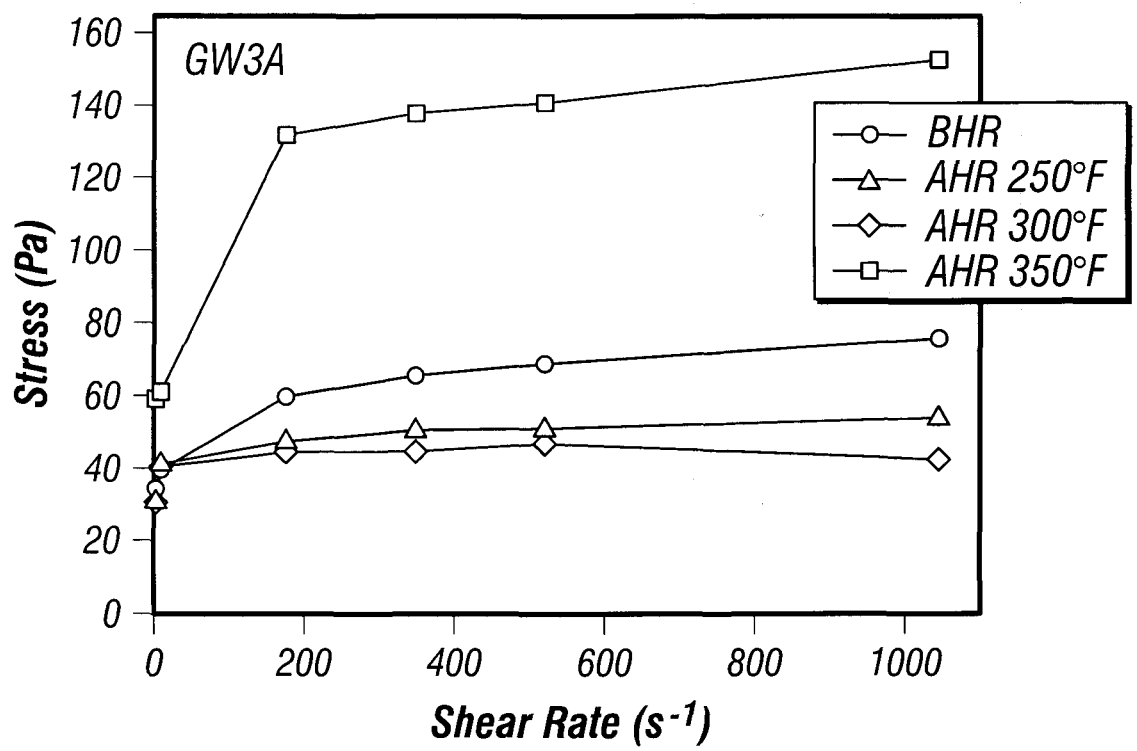

FIGS. 10a-c show values of the yield points (the shear stress at zero shear rate, calculated by extrapolation of measured shear stress vs. shear rate flow curves to zero shear rate), 10" gel strengths and plastic viscosities (the slope of the measured shear stress vs. shear rate curve at the highest measured shear rates) at 20° C. of various unaged muds. FIG. 10a shows these values for muds containing 28 g/l of bentonite and different amounts of M111; FIG. 10b shows these values for muds containing 33 g/l of bentonite and different amounts of is M107; and FIG. 10c shows these values for muds containing 33 g/l of bentonite and different amounts of BN-2.

Although all three Martinswerk products do increase the gel- and shear thinning characteristics of bentonite mud, the M111 agent is the most reproducible and effective among them. We believe this reproducibility is due to the surfactant which is present only on the M111-particles, and which facilitates dispersion of the powdered material into a suspended colloid. The less strong correlation between thickener concentration and gel strength in the case of M107 and BN-2 may be caused by the poorer dispersability of these surfactant-free powders.

A surprisingly low concentration of M111 material is required to produce a thickening effect in the bentonite mud. We believe this is also connected with the surfactant present on the M111 particles: the surfactant allowing heteroflocculation between M111 and bentonite particles while opposing mutual aggregation between M111 particles. That is, the surfactant apparently promotes selective inter-particle bridging.

Flow curves, measured in shear sweeps at 20.degree. C., for four mixtures before hot rolling (BHR) and after hot rolling (AHR) at ageing temperatures of 250, 300 and 350° F. are shown respectively in FIGS. 11a-d, the mixtures containing (a) 28 g/l bentonite and 1.2 g/l M111, (b) 33 g/l bentonite and 3.4 g/l M107, (c) 33 g/l bentonite and 5.6 g/l BN-2, and (d) 33 g/l bentonite and 3.3 g/l GW3A. Mixture (d) is similar to Example System 1 discussed above.

For all of the muds, ageing up to 300° F. led to a decrease in stress at medium and high shear rates compared to the stress BHR, while leaving the low shear rate gel characteristics substantially unchanged. Thus the measured stress profiles became flatter than before ageing, which suggests that wall-slip could be affecting these measurements.

The low shear rate stresses are several times higher than the shear stress measured for the unaged bentorite base mud without thickener (see FIG. 2). Combined with the very low plastic viscosities observed for the aged muds, this indicates that the muds would make useful drilling muds (i.e. the shear thinning behaviour is conserved after ageing at temperatures of up to 300° F.).

A general characteristic of the behaviour of all the muds, except for the BN-2 boehmite mud, is an increase in stress at all shear rates after the final ageing step at 350° F. However, from FIG. 5 we expect this trend to be reversed again at even higher temperatures/ageing times, and therefore we do not regard this as a threat to practical use.

Figure 12:
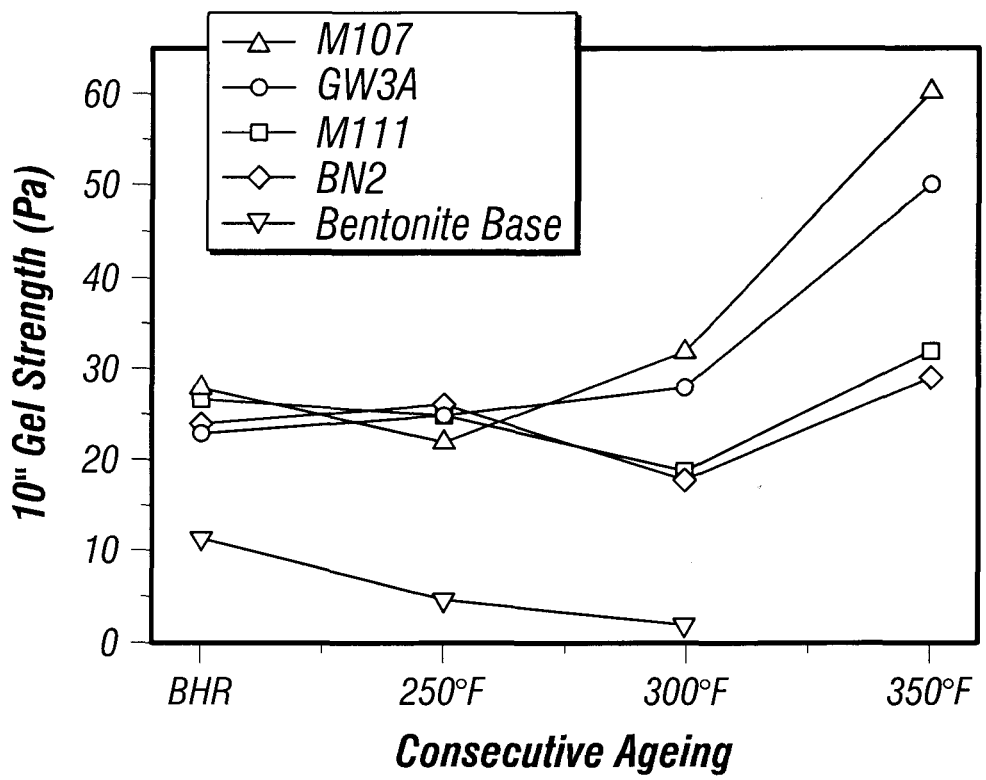
FIG. 12 shows the 10" gel strengths at 20° C. of the mixtures of FIGS. 11a-d as a function of the consecutive ageing temperatures.

The 10" gel strengths at 20° C. of these, muds is shown in FIG. 12 as a function of the consecutive ageing temperatures.

Figure 13:
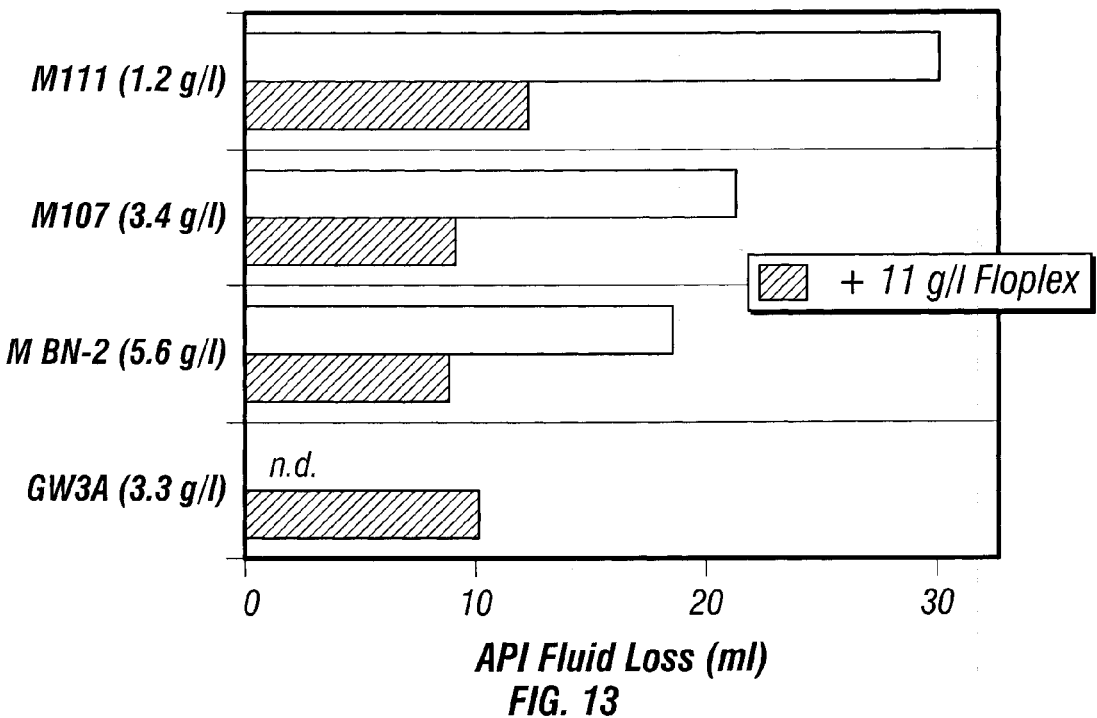
FIG. 13 shows the results of API fluid loss tests performed on the muds of FIGS. 11a-c, and the results of further tests after the addition of 11 g/l of Floplex to each mud. The Figure also shows the result an API fluid loss test performed on the mud of FIG. 11d after an addition of 11 g/l of Floplex.

API fluid loss tests were performed on the M111, M107 and BN-2 muds, and then re-performed after the addition of 11 g/l of Floplex to each mud. An API fluid loss test was also performed on the GW3A mud after an addition of 11 g/l of Floplex. The results of the tests are shown in FIG. 13. With Floplex added, the fluid loss of the M111 mud was slightly higher than that of the GW3A mud, but the fluid losses of all the muds with Floplex added were comparable to those shown in FIG. 6. It was noted that the addition of Floplex also gave rise to a moderate increase in the gel strengths of the muds.

Rheology and Thermal Stability of Muds Containing AS 100, AS 200 and AS 520

Three muds containing 33 g/l of bentonite and 5.4 g/l of respectively AS 100, AS 200 and AS 520 were prepared. Because the pH of the Aluminasol suspensions was low (pH is about 4) to ensure the stability of the positively charged particles in the suspensions, care had to be taken to prevent the bentonite mud collapsing at low pH values when the Aluminasol suspensions were added to the mud. Therefore each suspension was added in a sequence of small additions, with pH readjustment of the mud between each addition. Each mud was then rheologically and thermally tested in a similar manner to Martinswerk samples, except that (i) a Bohlin™ rheometer with a Couette geometry was used instead of the Chan rheometer, and (ii) the thermal ageing was performed without rolling of the autoclave bombs.

Figure 14:
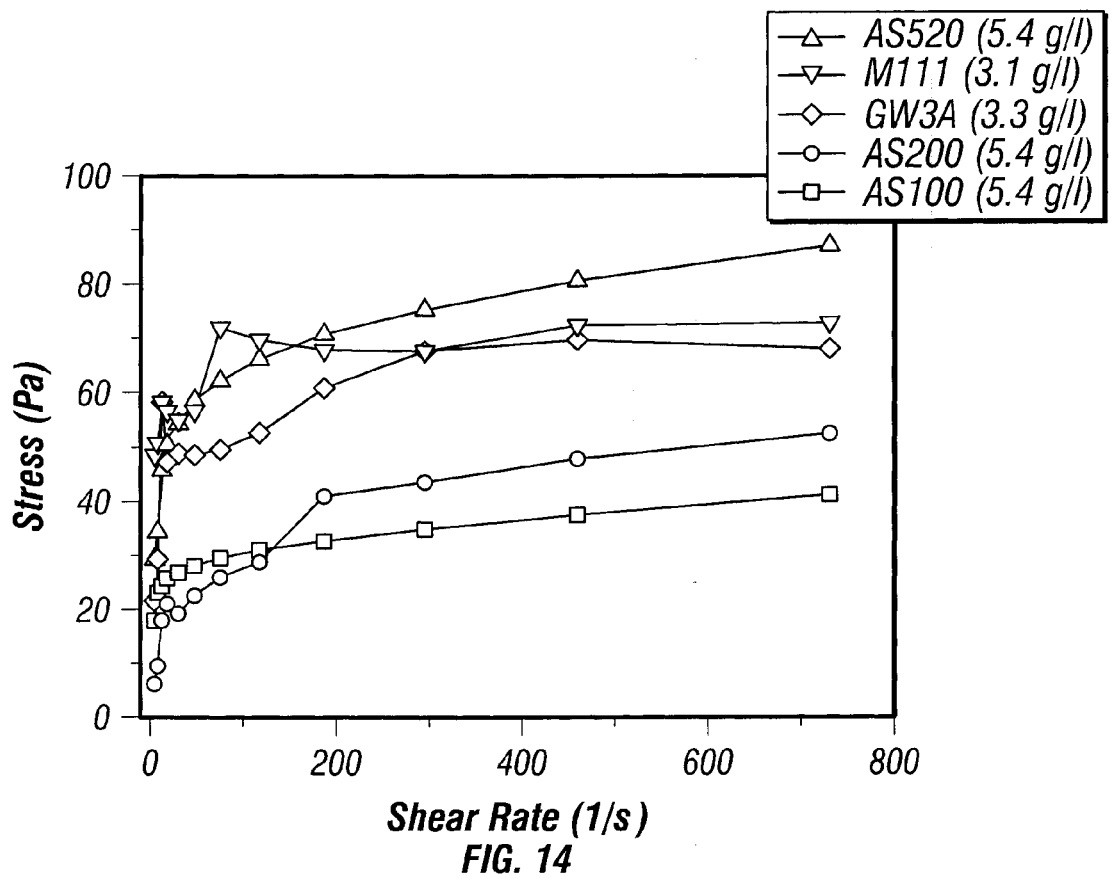
FIG. 14 shows flow curves before static ageing (BSA) for three Aluminasol-containing muds, and the M111 and GW3A muds of FIGS. 11a and d.

FIG. 14 shows flow curves, measured in shear sweeps at 20° C., for the three Aluminasol-containing muds and, for comparison, the M111 and GW3A muds previously described. Of the Aluminasol muds, only the one containing AS 520 had rheological characteristics comparable to the model gibbsite GW3A and M111 muds. The poorer performance of AS 100 and AS 200 does not seem to be connected with their particle sizes, which are practically equal to that of AS 520. It seems more likely that the difference in performance stems from unidentified chemical additives whose presence was indicated by ultra centrifuge measurements on the Aluminasol suspensions.

Figure 15:
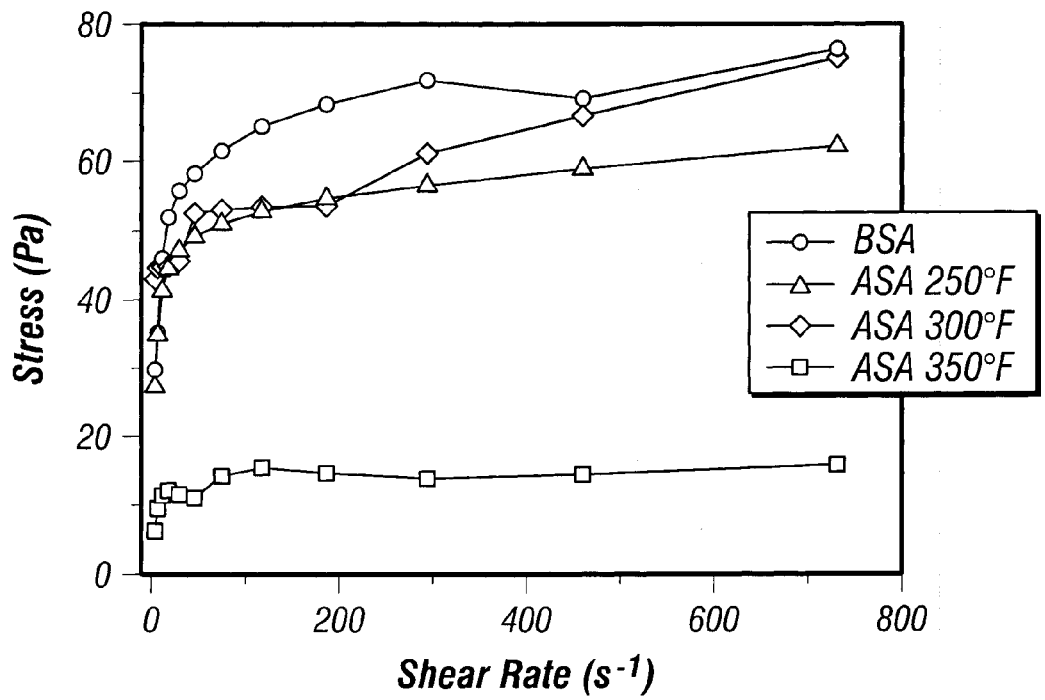
FIG. 15 shows flow curves for the AS 520 mud of FIG. 14 before static ageing (BSA) and after static ageing (ASA) at consecutive temperatures of 250, 300 and 350° F.

The stability of the rheological behaviour of the AS 520 mud was tested as a function of ageing history. FIG. 15 shows flow curves, measured in shear sweeps at 20° C., for the AS 520 mud before static ageing (BSA) and after static ageing (ASA) at consecutive temperatures of 250, 300 and 350° F. The flow curves were more or less stable with ageing up to 300° F., but the shear stress reduced dramatically after the last ageing step at 350° F. This may be due to the unidentified chemical additives in the AS 520 suspension.

Rheology of a Mud Containing MH-1

MH-1 was mixed as a dry powder to a bentonite base and then dispersed in water to form muds containing up to 10 g/l of MH-1 and 33 g/l of bentonite. The muds were then rheologically tested in a similar manner to Martinswerk samples. Thermal ageing was not performed.

Figure 16:
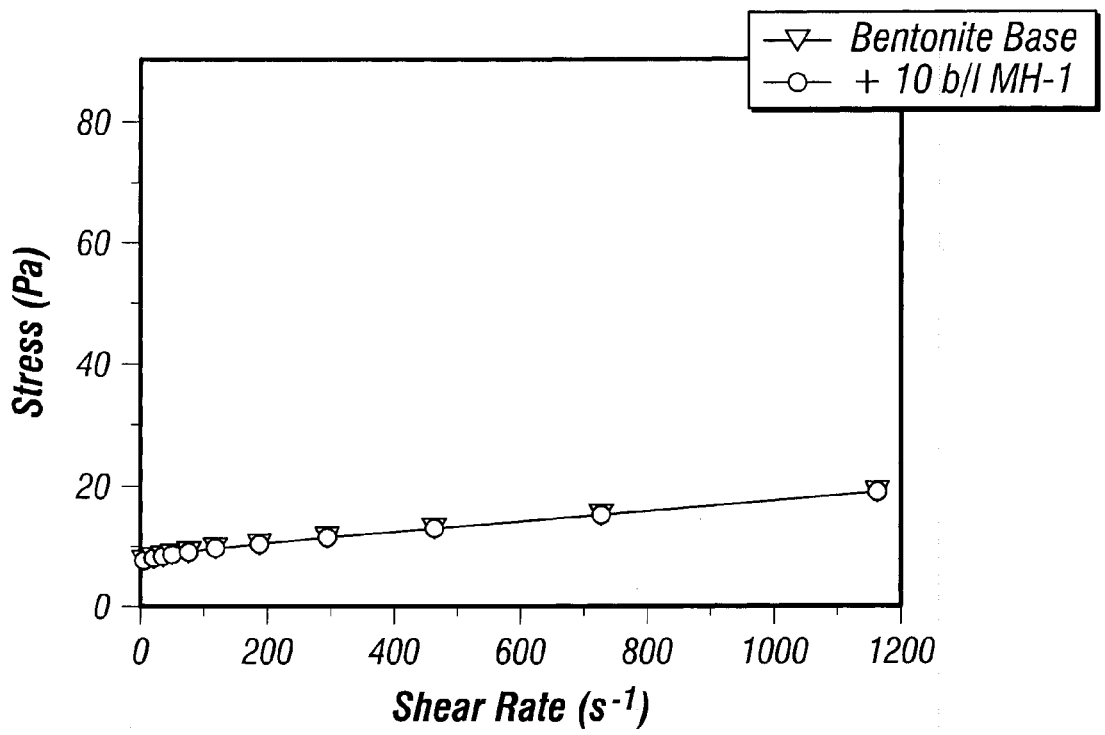
FIG. 16 show a flow curve for a mud containing 33 g/l of bentonite and 10 g/l of MH-1.

FIG. 16 show the flow curve, measured in a shear sweep at 20.degree. C., for the mud with 10 g/l of MH-1. Although the MH-1 concentration was varied up to 10 g/l, the Malakoff gibbsite did not thicken the 33 g/l bentonite mud we believe the reason for this was the size of the MH-1 particles, which was too large for the gibbsite to form a colloidal suspension in the mud. This prevented a gel network mediated by van der Waals interactions between the bentonite and MH-1 particles from being formed.

Synthesis of Gibbsite

Synthesis routes for the preparation of gibbsite were investigated to provide alternatives to the commercially available gibbsites and boehmites discussed above.

Figure 17:
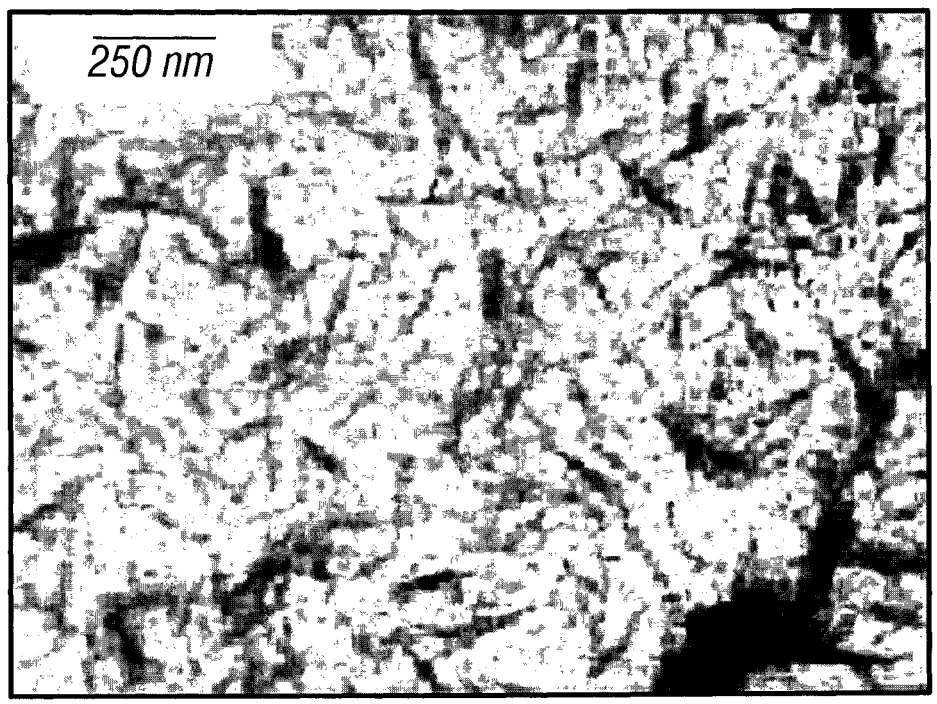
FIG. 17 shows an electron micrograph of rod-like colloidal particles formed as a result of hydrothermal treatment of ACH.

An amount of $Al_2(OH)_5Cl_3H_2O$ (ACH) was received from Hoechst under the name of Locron P™. ACH solutions were treated hydrothermally for 24-96 hours at 85° C. FIG. 17 shows an electron micrograph of the rod-like (which is characteristic of boehmite) colloidally suspended particles which were formed as a result of the hydrothermal treatment. Laser beam scattering indicated that longer treatment periods led to higher concentrations of the particles.

However, after hydrothermal treatment the concentration of $Al^{3+}$ in solution was still very high and $Al(OH)_3$ precipitated when the solution was brought to pH 10.5.

Thus two different methods were investigated for the formulation of bentonite-base muds. In the first method, the pH of an ACH solution was adjusted to pH 10.5 prior to its addition to a bentonite-base mud. This led to $Al(OH)_3$ precipitation before contact with the mud. In the second method, ACH powder was added directly to the alkaline bentonite mud, leading to in situ $Al(OH)_3$ precipitation.

The first method yielded particles which were colloidal-sized (about 150 nm according to ultra-centrifuge measurements) and could be expected to be rather poorly defined in shape. Visual inspection of a mud containing 35 g/l bentonite and 5 g/l ACH-colloid mixture indicated that excellent rheological behaviour was obtained.

In the second method, the addition of the ACH powder gave rise to instantaneous gelation of the bentonite mud. We believe that the $Al^{3+}$ precipitated immediately, probably as amorphous $Al(OH)_3$ particles of undefined shape. In situ preparation of $Al(OH)_3$ particles may have practical advantages as a method of thickening drilling fluids.

Figure 18:
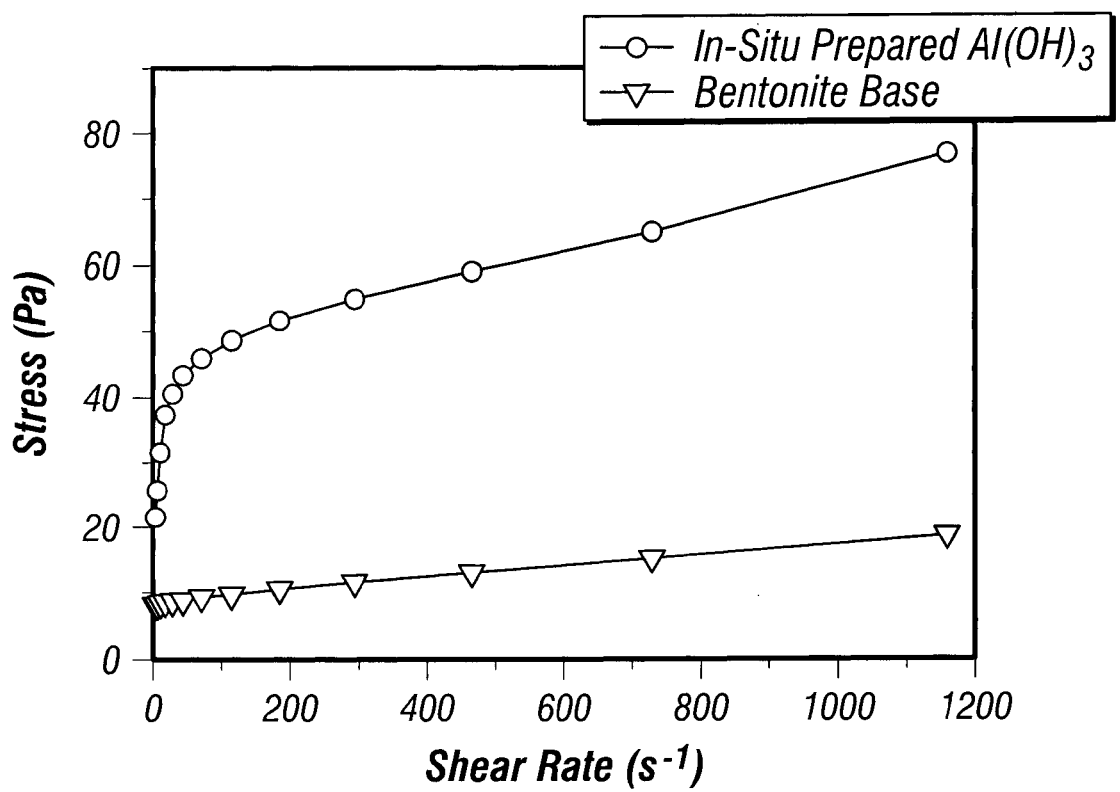
FIG. 18 shows flow curves for a 33 g/l bentonite mud with and without in situ precipitated AL(OH)$_3$.

FIG. 18 shows flow curves, measured in shear sweeps at 20° C., for a 33 g/l bentonite mud with and without in situ precipitated $Al(OH)_3$ formed by the addition (to the mud at pH 10.5) of 5 g/l of ACH.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A shear-thinning, water-based process fluid comprising:
   clay particles,
   non-clay colloidal particles, and
   salt,
   which, by heteroflocculation of the clay particles and the non-clay colloidal particles, forms effectively instantaneously a 10" gel strength at 20° C. in the range 15 to 70 Pa and maintains said 10" gel strength at 20° C. in the range 15 to 70 Pa after ageing at a pressure of 1.7 MPa for consecutive periods of 16 hours at 240° F. (115.6° C.) and 16 hours at 300° F. (148.9° C.).

2. A process fluid according to claim 1, wherein the median diameter of the colloidal particles does not exceed 1 µm.

3. A process fluid according to claim 1, wherein the salt comprises NaCl and/or KCl.

4. A process fluid according to claim 1, wherein the colloidal particles are non-spherical.

5. A process fluid according to claim 1 comprising a surfactant on the surfaces of the colloidal particles.

6. A process fluid according to claim 1 which exhibits reversible shear-thinning behaviour at 20° C. for all shear rates in the shear rate range 5 to 1000 $s^{-1}$.

7. A process fluid according to claim 1, having a rate of change of viscosity with a shear rate at 20° C. of between −10 and −0.01 Pa·s for all shear rates in the shear rate range 5 to 1000 $s^{-1}$.

* * * * *